(12) United States Patent
Falconetti et al.

(10) Patent No.: US 10,045,265 B2
(45) Date of Patent: Aug. 7, 2018

(54) ADAPTIVE CONTROL OF CHANNEL QUALITY OFFSET FOR CELL ASSOCIATION

(71) Applicant: Telefonaktiebolaget L M Ericsson (publ), Stockholm (SE)

(72) Inventors: Laetitia Falconetti, Aachen (DE); Torsten Dudda, Aachen (DE); Jörg Huschke, Aachen (DE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 410 days.

(21) Appl. No.: 14/320,688

(22) Filed: Jul. 1, 2014

(65) Prior Publication Data

US 2015/0004982 A1 Jan. 1, 2015

(30) Foreign Application Priority Data

Jul. 1, 2013 (EP) .................................... 13174562

(51) Int. Cl.
*H04W 36/00* (2009.01)
*H04W 88/08* (2009.01)

(52) U.S. Cl.
CPC ... *H04W 36/0088* (2013.01); *H04W 36/0072* (2013.01); *H04W 36/0083* (2013.01); *H04W 88/08* (2013.01)

(58) Field of Classification Search
CPC ......... H04W 36/0088; H04W 36/0083; H04W 88/08; H04W 36/0072
See application file for complete search history.

(56) References Cited

U.S. PATENT DOCUMENTS

| | | | |
|---|---|---|---|
| 8,886,198 B2* | 11/2014 | Tinnakornsrisuphap | ............................ H04W 36/04 455/436 |
| 8,903,405 B2* | 12/2014 | Noh ...................... H04W 36/30 455/422.1 |
| 2012/0088507 A1* | 4/2012 | Legg ................... H04W 36/245 455/436 |
| 2012/0018888 A1 | 7/2012 | Simonsson et al. | |
| 2012/0190365 A1 | 7/2012 | Jeong et al. | |
| 2013/0045749 A1* | 2/2013 | Sridhar ............ H04W 36/0083 455/443 |
| 2014/0153545 A1* | 6/2014 | Dimou ................. H04W 36/30 370/332 |

FOREIGN PATENT DOCUMENTS

| | | |
|---|---|---|
| GB | 2484534 A | 4/2012 |
| WO | 2014135193 A1 | 9/2014 |

* cited by examiner

*Primary Examiner* — Joseph Dean, Jr.
(74) *Attorney, Agent, or Firm* — Sage Patent Group

(57) ABSTRACT

A network node serves a cell of a mobile network. The network node indicates an offset value to a user equipment in the cell. The offset value is added to a channel quality value measured by the user equipment for triggering a handover from the cell to a further cell of the mobile network. The network node increases the indicated offset value until a handover of the user equipment to the further cell of the mobile network is triggered. After the handover to the further cell, the network node receives an indication of a channel quality of a downlink control channel of the further cell as experienced by the user equipment, e.g., in control signalling of a further handover of the user equipment back to the cell or in a request to protect radio resources of the downlink control channel.

22 Claims, 12 Drawing Sheets

ADAPTIVE CONTROL OF CHANNEL QUALITY OFFSET FOR CELL ASSOCIATION

RELATED APPLICATION

This application claims priority under 35 U.S.C. § 119(a) to European Patent Application No. 13174562.2, which was filed Jul. 1, 2013 and is incorporated herein by reference in its entirety.

TECHNICAL FIELD

The present invention relates to methods for controlling radio transmission in a mobile network and to corresponding devices.

BACKGROUND

In a mobile network, it is known to use a heterogeneous deployment with high power base stations, also referred to as macro base stations, and low power base stations, also referred to as pico base stations. In such heterogeneous deployment, a conventional cell association mechanism, which is based on a downlink (DL) received signal strength as measured by a user equipment (UE), typically results in a limited coverage area of the pico base stations. The coverage area may however be extended by adding a bias or offset to the DL received signal strength of a pico base station as measured by the UEs, and using the biased DL received signal strength in the cell association mechanism. This mechanism is also referred to as cell individual offset (CIO). Using the CIO mechanism has the effect that also UEs near the cell border, which measure a lower DL received signal strength, will be associated with the cell so that the cell coverage area is extended. However, this may also have the effect that certain UEs experience a negative (on the logarithmic scale) Signal-to-Interference/Noise Ratio (SINR). In particular, the added bias may have the effect that a UE is associated with the pico base station, but the DL received signal strength from a macro base station is larger than the measured (unbiased) DL received signal strength of the pico base station. The interference from the macro base station is thus larger than the useful radio signal from the pico base station. The interference may affect both a data channel of the pico base station's cell and a control channel (CCH) of the cell. Specifically the interference on the CCH may prevent proper serving of the UE in the extended coverage area of the cell.

Accordingly, the offset which is added to the measured DL received signal strength needs to be suitably dimensioned. A too small value of the offset may result in a too small coverage area of the pico cell and therefore limit the capacity gain offered by the pico cell. A too high value of the offset may in turn result in unsuccessful cell association attempts of a UE, which is undesirable as well.

Accordingly, there is a need for techniques which allow for efficiently controlling radio transmissions in a mobile network in which the cell association of a UE can be controlled by configuring an offset to be added to a channel quality value, e.g., DL received signal strength, as measured by the UE.

SUMMARY

According to a first aspect of the invention, a method of controlling radio transmission in a mobile network is provided. According to the method, a network node serves a cell of the mobile network. The network node indicates an offset value to a UE in the cell. The offset value is to be added to a channel quality value measured by the UE for triggering a handover from the cell to a further cell of the mobile network. The network node increases the indicated offset value until a handover of the UE to the further cell is triggered. After the handover to the further cell, the network node receives an indication of a channel quality of a DL CCH of the further cell as experienced by the UE.

According to an embodiment, the network node adjusts the offset value in response to the received indication of the channel quality of the downlink control channel.

According to an embodiment, the network node performs a further handover of the user equipment from the further cell back to the cell. After the further handover, the network node indicates the adjusted offset value to the UE.

According to an embodiment, the network node receives the indication of the channel quality of the DL CCH in control signalling related to the further handover of the UE.

According to an embodiment, the network node receives a recommendation for the adjusted offset value from a further network node serving the further cell.

According to an embodiment, the network node applies the adjusted offset value for a group of UEs which includes the above-mentioned UE.

According to an embodiment, the network node protects radio resources of the DL CCH which are assigned to the UE. This is accomplished in response to the received indication of the channel quality of the DL CCH. For example, the indication of the channel quality of the DL CCH may correspond to a request to protect radio resources of the DL CCH. The protection of the radio resources may be performed by configuring one or more Almost Blank Subframes (ABSs) or Reduced Power Subframes (RPSs).

According to an embodiment, the network node monitors a number of handover sequences of the UE from the cell to the further cell and back to the cell. Depending on the monitored number of handover sequences, the network node may prevent a further handover of the UE to the further cell.

According to an embodiment, the network node stores an identity of the UE. In addition or as an alternative, the network node may also store the offset value as indicated to the UE before the handover to the further cell is triggered.

According to an embodiment, the increase of the offset value is limited by a configurable maximum offset value.

According to an embodiment, the cell is served by a macro base station and the further cell is served by a pico base station having a lower transmit power than the macro base station.

According to a second aspect of the invention, a method of controlling radio transmission in a mobile network is provided. According to the method, a network node serves a cell of the mobile network. The network node performs a handover of a UE from a further cell of the mobile network to the cell. Further, the network node receives an indication of an offset value added to a channel quality value measured by the UE for triggering the handover to the cell. The network node determines a channel quality of a DL CCH of the cell as experienced by the UE. Further, the network node sends an indication of the determined channel quality of the DL CCH to a further network node serving the further cell.

According to an embodiment, the network node adjusts a further offset value to be added to a channel quality value measured by the UE for triggering a handover from the cell. This is accomplished depending on the determined channel quality of the DL CCH. The network node then indicates the adjusted further offset value to the UE.

According to an embodiment, the network node applies the adjusted further offset value for a group of UE which includes the above-mentioned UE.

According to an embodiment, the network node performs a further handover of the UE from the cell back to the further cell. The network node may then indicate the adjusted further offset value to a further network node serving the further cell.

According to an embodiment, the network node stores an identity of the UE. In addition or as an alternative, the network node stores the further offset value as indicated to the UE before the handover to the further cell is triggered.

According to an embodiment, wherein the network node sends the indication of the channel quality of the DL CCH in control signalling related to the further handover of the UE.

According to an embodiment, the network node monitors a number of handover sequences of the UE from the further cell to the cell and back to the further cell. Depending on the monitored number of handover sequences, the network node may prevent a further handover of the UE from the further cell to the cell.

According to an embodiment, the network node sends the indication of the channel quality of the DL CCH by requesting the further network node to protect radio resources of the DL CCH which are assigned to the UE. The protection of the radio resources may be performed by configuring one or more ABSs or RPSs.

According to an embodiment, the cell is served by a pico base station and the further cell is served by a macro base station having a higher transmit power than the pico base station.

The methods according to the first and second aspects may also be combined to be performed by a system comprising a first network node serving a first cell and a second network node serving a second cell, the method of the first aspect being performed by the first network node and the method of the second aspect being performed by the second network node.

According to a third aspect of the invention, a network node for serving a cell of a mobile network is provided. The network node comprises at least one interface and at least one processor. The at least one processor is configured to indicate, to a UE in the cell, an offset value to be added to a channel quality value measured by the UE for triggering a handover from the cell to a further cell of the mobile network. Further, the at least one processor is configured to increase the indicated offset value until a handover of the UE to the further cell is triggered. Further, the processor is configured to receive, after the handover to the further cell, an indication of a channel quality of a DL CCH of the further cell as experienced by the UE.

The network node of the third aspect may be configured to operate according to the method of the first aspect.

According to a fourth aspect of the invention, a network node for a mobile network is provided. The network node comprises at least one interface and at least one processor. The at least one processor is configured to perform a handover of a UE from a further cell of the mobile network to the cell. Further, the at least one processor is configured to receive an indication of an offset value added to a channel quality value measured by the UE for triggering the handover to the cell. Further, the at least one processor is configured to determine a channel quality of a DL CCH of the cell as experienced by the UE. Further, the at least one processor is configured to send an indication of the determined channel quality of the DL CCH to a further network node serving the further cell.

The network node of the fourth aspect may be configured to operate according to the method of the second aspect.

According to a further embodiment of the invention, a computer program comprising program code to be executed by at least one processor of a network node of a mobile network is provided. Execution of the program code causes the network node to perform the method according to the first aspect or the method according to the second aspect.

DETAILED DESCRIPTION OF EMBODIMENTS

Figure 1:
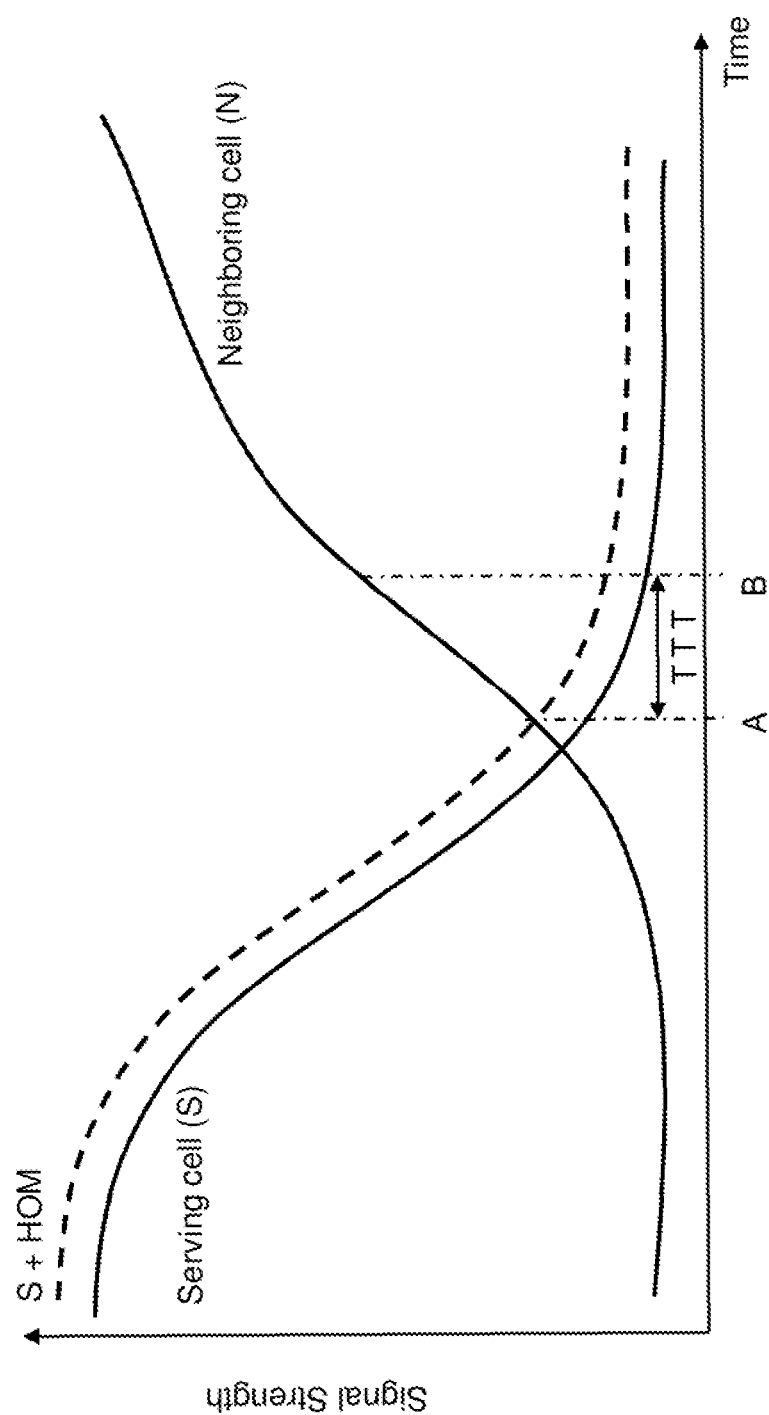
FIG. 1 schematically illustrates a signal strength measurement as considered in an exemplary handover scenario according to an embodiment of the invention.

In the following, concepts in accordance with exemplary embodiments of the invention will be explained in more detail and with reference to the accompanying drawings. The illustrated embodiments relate to concepts for controlling radio transmission in a mobile network. The embodiments specifically refer to a scenario using the LTE (Long Term Evolution) radio access technology as specified by 3GPP ($3^{rd}$ Generation Partnership Project) and a heterogeneous network deployment. In particular, it is assumed that the concepts are applied for controlling cell association of UEs by appropriately setting an offset which is added to a channel quality value measured by a UE for triggering a handover (HO) from one cell to another cell. However, it should be understood that the concepts could also be applied in connection with other deployments, e.g., homogeneous deployments using multiple base stations of substantially the same power, or other radio access technologies, e.g., UMTS (Universal Mobile Telecommunications System) radio access technology.

In the illustrated examples, it is assumed that UEs which are operable in the mobile network participate in the process of associating a specific UE to a certain cell by performing and reporting measurements. For example, such measurements could be configured as specified in 3GPP Technical Specification (TS) TS 36.331 V11.3.0.

For example, such measurements may be used to determine a Reference Signal Received Power (RSRP) and/or a Reference Signal Received Quality (RSRQ). The RSRP is a cell specific measure of signal strength and it is mainly used for ranking different cells for HO and cell reselection purposes. The RSRP is typically calculated as the linear average of the power of the Resource Elements (REs) which carry Cell-specific Reference Signals (CRSs). The RSRQ, on the other hand, also takes the interference into consideration by taking the total received wideband power Received Signal Strength Indication (RSSI) averaged over the CCH and data channel, in LTE specifically the Physical Downlink Shared Channel (PDSCH).

Sending of a measurement report by a UE may be triggered by certain events. In relation to HOs between cells, such an event may in particular be defined by the criterion that the channel quality of a neighbour cell of the present serving cell of the UE becomes better than the channel quality of the serving cell plus a handover margin. This criterion may also be formulated as:

$$N > S + HOM, \quad (1)$$

where N and S are the signal strengths of the neighbour cell and serving cell, respectively, and HOM is the handover margin. The handover margin is the difference between the channel quality of the neighbour cell and the channel quality of the neighbour cell which needs to be exceeded before attempting a HO. The channel quality may be measured either using the RSRP or the RSRQ. Further details may be implemented as for example specified in 3GPP TS 36.133 V11.4.0.

The handover margin may in turn be defined as follows:

$$HOM = Ofs + Ocs + Off - Ofn - Ocn + Hys, \quad (2)$$

Ofs is a frequency specific offset of the serving cell, Ocs is a cell individual offset (CIO) of the serving cell, Ofn is a frequency specific offset of the neighbor cell, Ocn is the a CIO of the neighbor cell, Off is an additional offset for controlling triggering of the measurement report, and Hys is a hysteresis parameter.

As illustrated in FIG. 1, if condition in (1) is satisfied and remains valid for a certain duration, known as Time To Trigger (TTT), the UE sends a measurement report. In FIG. 1, condition (1) would be satisfied at point A, and the measurement report would be sent at point B. In response to the measurement report, a network node of the serving the cell, e.g., a base station, in the LTE radio access technology referred to as evolved Node B (eNB), may initiate a HO of the UE to the neighbour cell. The HO may be performed via direct communication between the eNB of the serving cell and the eNB of the neighbour cell, using an interface between the eNBs which is referred to as X2, or via indirect communication of the eNBs with the core network (CN), using an interface of the eNBs which is referred to as S1 interface. The HO may generally be implemented as specified in 3GPP TS 36.300 V11.5.0.

Figure 2:
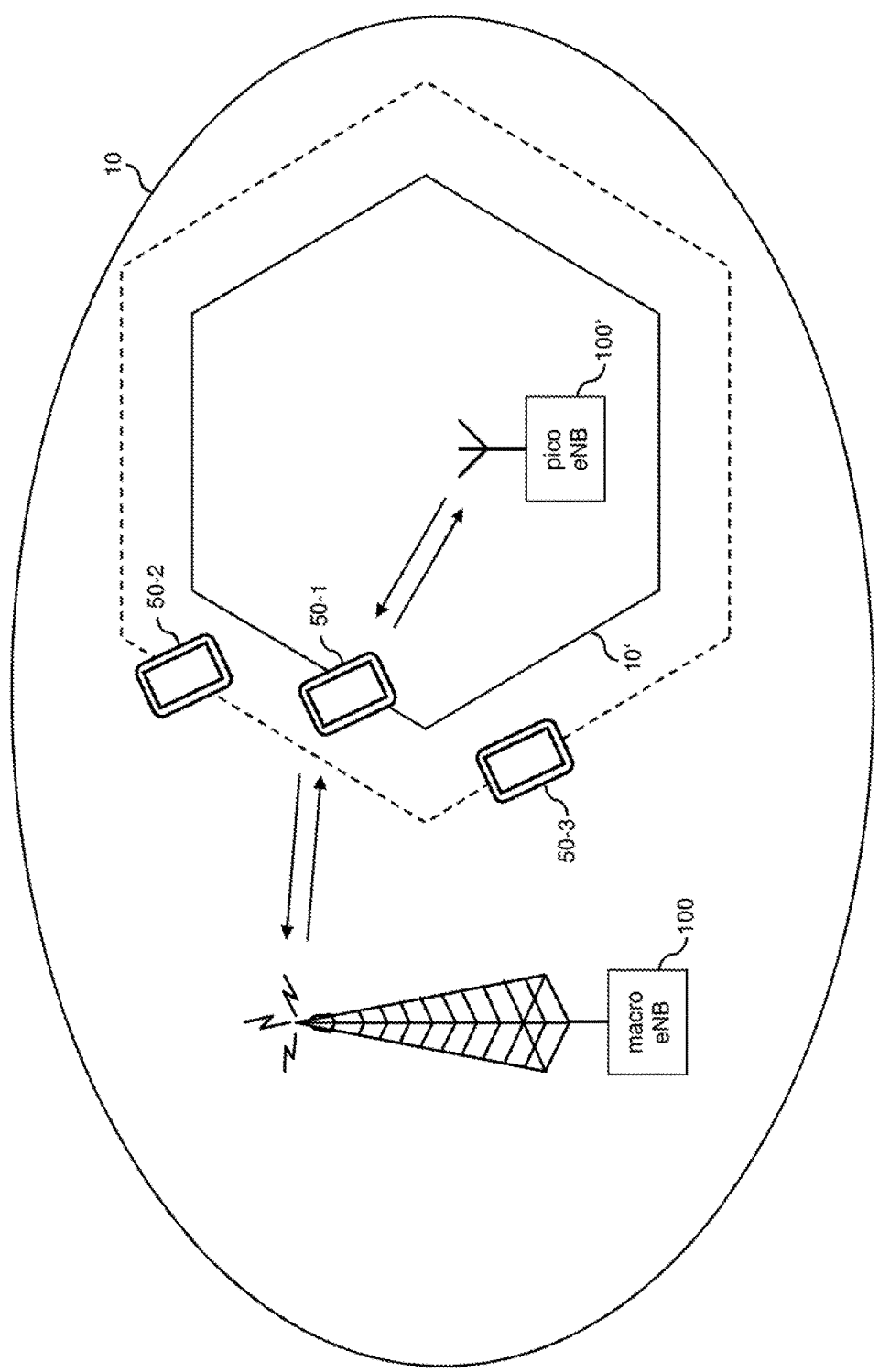
FIG. 2 shows an exemplary mobile network environment in which cell association is controlled in accordance with an embodiment of the invention.

FIG. 2 illustrates a scenario which is based on a heterogeneous network deployment with a macro cell 10 and a pico cell 10'. The macro cell 10 is served by a macro eNB 100 which operates with a higher transmit power than a pico eNB 100' serving the pico cell 10'. Further, FIG. 2 also illustrates exemplary UEs 50-1, 50-2, 50-3 which may be associated with the macro cell 10 or with the pico cell 10'. The individual cell association selection for each of the UEs 50-1, 50-2, 50-3 may be based on a measurement report from the UE 50-1, 50-2, 50-3 as described above.

Each cell 10, 10', provides a DL CCH for conveying DL control information from the eNB 100, 100' to the UE(s) 50-1, 50-2, 50-3 associated with the cell 10, 10'. In the illustrated LTE scenario, the DL CCH may correspond to the Physical Downlink Control Channel (PDCCH). Further each cell 10, 10' provides a data channel for carrying user data between the eNB 100, 100' and the UE(s) 50-1, 50-2, 50-3 associated with the cell 10, 10'. The data channel may include a DL data channel, e.g., the PDSCH, and an UL data channel, e.g., the Physical Uplink Shared Channel (PUSCH) of the LTE radio access technology. Further, each cell 10, 10' may also provide an uplink (UL) control channel (UL CCH) for conveying UL control information from the UEs 50-1, 50-2 to the eNB 100, 100'. The UL control information may for example include feedback messages for positively or negatively acknowledging receipt of data on the data channel. In the illustrated LTE scenario, the UL CCH may correspond to the Physical UL Control Channel (PUCCH).

As illustrated in FIG. 2 by a dashed line enclosing the pico cell 10', the coverage area of the pico cell 10' may be extended by suitably setting the CIO values used in the cell association mechanism, i.e., the above mentioned values Ocn and Ocs. In this way, a bias may be added to the channel quality value measured for the pico cell 10', which results in certain UEs close to the border of the cell coverage area being associated rather to the pico cell 10' than to the macro cell, which effectively corresponds to an extension of the coverage area of the pico cell 10'. In this way, the pico cell 10' may be better utilized for serving UEs, thereby enhancing overall capacity of the mobile network. The values of Ocn and Ocs may be indicated to the respective UEs 50-1, 50-2, 50-3 in control information transmitted by the eNBs. The values may differ between different UEs 50-1, 50-2, 50-3 or may be the same for a group of UEs 50-1, 50-2, 50-3. In order to extend the coverage area of the pico cell 10', the macro eNB 100 may indicate a higher value of Ocn and/or a lower value of Ocs to its served UEs.

The concepts as described in the following may be used for obtaining an advantageous setting the CIO values Ocn and/or Ocs. This setting may also dynamically take into account the current traffic load or channel conditions. According to these concepts, a network node of a cell currently serving a UE may increase the CIO value until a HO of the UE is triggered. After the HO, the quality of the DL control channel as experienced by the UE is determined in the further cell. The determined quality of the control channel is indicated to the network node, which thereby becomes aware whether the increased CIO value was appropriate or not. The network node may then react accordingly, e.g., by adjusting the CIO value to a lower value when the UE performs a HO back to the cell served by the network node or by protecting resources of the DL CCH to improve the quality of the DL CCH as experienced by the UE in the further cell. In each case, the chances of successfully offloading the UE to the further cell may be improved by allowing usage of a CIO value which is increased towards its maximum possible value.

Figure 3:
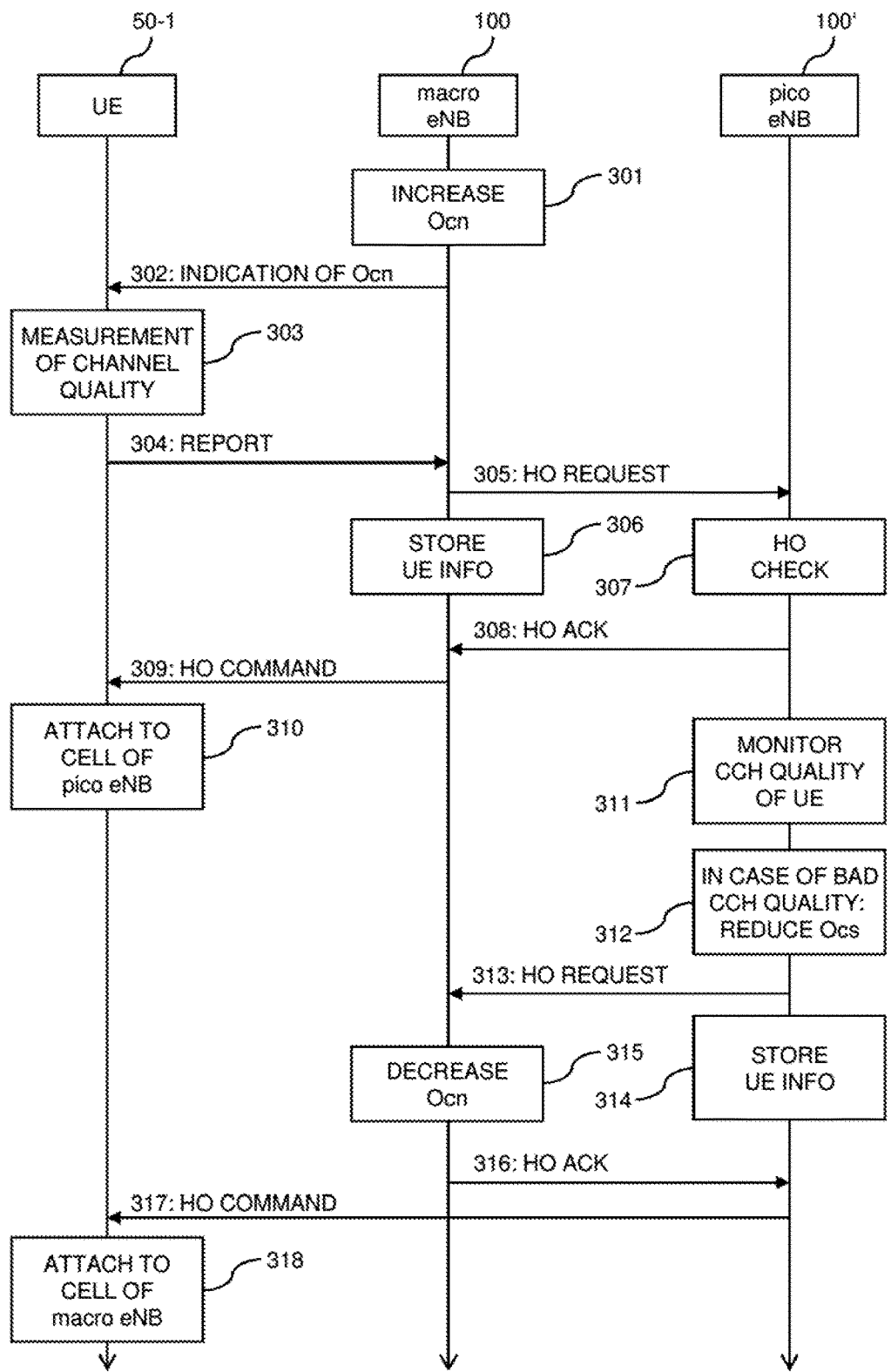
FIG. 3 shows a signalling diagram for illustrating cell association processes according to an embodiment of the invention.

FIG. 3 shows a signalling diagram for illustrating exemplary procedures for implementing such concepts in a scenario as illustrated in FIG. 2. The procedures are described as being applied with respect to the UE 50-1 and further involve the macro eNB 100 and the pico eNB 100'. It is assumed that initially the UE 50-1 is served by the macro eNB 100 and an initial value of Ocn is set, e.g., based on a default setting or some suitable algorithm.

At step 301, the macro eNB 100 increases Ocn for the pico cell 10'. This may be accomplished regularly under the control of a timer. The timer may be UE specific or may be applied with respect to a group of UEs. The increase may be limited by a configurable maximum value. The maximum value may be constant or may be determined by a suitable algorithm, e.g., depending on load or the total utility of users of the macro cell 10 and/or the pico cell 10'. The utility of a user is typically a function of the user throughput.

Using message 302, the increased value of Ocn is indicated to the UE 50-1. Message 302 may be a RRC (Radio Resource Control) message. For LTE it may be configured using the information element MeasObjectEUTRA specified in 3GPP TS 36.331

As indicated by step 303, the UE 50-1 may then perform measurements of the channel quality as typically used for triggering a HO, e.g., by measuring the RSRP or RSRQ for the macro cell 10 and for the pico cell 10'. Here, also the indicated value of Ocn is taken into account when controlling the triggering of a measurement report to the macro eNB 100. The higher the value of Ocn, the more likely the condition for measurement reporting is met. In the procedures of FIG. 3, it is assumed that the condition for triggering the measurement report is met, and the measurement report is sent with message 304 to the macro eNB 100.

Upon receiving the measurement report in message 304, the macro eNB 100 initiates a HO of the UE 50-1 to the pico cell 10'. For this purpose, the macro eNB 100 sends a HO request 305 to the pico eNB 100. Together with the HO request, the macro eNB 100 informs the pico eNB 100' about the value of Ocn as used for triggering the HO. This may for example be accomplished by providing a corresponding Information Element (IE) in the HO request 305. For example the HandoverPreparation IE as described in 3GPP TS 36.331 could be used for this purpose. After the HO, the pico eNB 100 may then utilize this value for indicating a corresponding value of Ocs to the UE 50-1.

Further, as indicated by step 306, the macro eNB 100 may store information concerning the UE 50-1 when performing the HO to the pico cell 10'. Specifically, the macro eNB 100 may store the identity of the UE 50-1 and typically also the value of Ocn which was used when triggering the HO of the UE 50-1. This information may be utilized when the UE 50-1 later returns to the macro cell 10.

In some implementations, the pico eNB 100' may also perform a HO check 307 to avoid repeated unsuccessful HO attempts for the UE 50-1. For example, when the macro eNB 100 sends the HO request 305, the pico eNB 100' may check whether the UE 50-1 was in the pico cell 10' before and, if so, also check the DL CCH quality of the UE 50-1 at that time. The pico eNB 100 could also compare the value of Ocs previously used for the UE 50-1 in the pico cell 10' and the Ocs to be currently applied. Depending on the HO check 307, the pico eNB 100' may reject the HO request 305. Thereby avoiding a risk of too poor performance of the UE 50-1 in the pico cell 10'.

In the illustrated procedures, it is assumed that the HO request 305 is not rejected. Accordingly, the pico eNB 100' sends a HO acknowledgement 308 to the macro eNB 100. The HO is then completed by the macro eNB 100 sending a HO command 309 to the UE 50-1 and the UE 50-1 attaching to the pico cell 10', as indicated by step 310. In the course of completing the HO, also the new values of Ocs and Ocn are indicated to the UE 50-1 (by the pico eNB 100').

The pico eNB 100 may then manage the values of Ocs and Ocn as indicated to the UE 50-1 while it is connected to the pico cell 10'. Further, as indicated by step 311, the pico eNB 100' monitors the quality of the DL CCH as experienced by the UE 50-1 in the pico cell 10'.

Procedures which may be applied for monitoring the quality of the DL CCH are described below. If the quality of the DL CCH is too low, e.g., below a threshold value, the pico eNB 100' may conclude that the value of Ocs was set too large, and the current traffic load and channel conditions are not favourable for the current Ocs value. The pico eNB 100' may then reduce the value of Ocs as indicated to the UE 50-1, thereby increasing the likelihood of a further HO of the UE 50-1 to another cell, e.g., back to the macro cell 10, as indicated by step 312.

The reduced value of Ocs may trigger a measurement report from the UE 50-1, which initiates a further HO of the UE 50-1, e.g., back to the macro cell 10, by sending a HO request 313 to the macro eNB 100.

When performing the HO back to the macro cell 10, the pico eNB 100' indicates that the reason for the HO is the quality of the DL CCH being too low or the value of Ocs being too large. This may be accomplished explicitly by a corresponding indicator. The pico eNB 100' may also recommend to the macro eNB 100 a new value of Ocn for the pico cell 10'. For example, the recommended new value of Ocn could be calculated according to $$Ocn = RSRP(macro) - RSRP(pico) - \Delta, \qquad (3)$$

where Δ is a safety margin to prevent that the UE 50-1 will perform a HO back to the pico cell 10' under similar conditions and then again face the same poor quality of the DL CCH. This recommended new value of Ocn may be indicated to the macro eNB 100' along with the information given in the HandoverPreparationInformation IE, which also includes the value of Ocs as applied by the pico cell 10' before the HO to the macro cell 10. In some scenarios, the latter indication of the value of Ocs may also be replaced by the recommended new value of Ocn, and a flag or some other indicator could be used to indicate that the value is an recommendation rather than a currently used value of Ocs.

As indicated by step 314, the pico eNB 100' may also store information concerning the UE 50-1. In particular, the identity of the UE 50-1 and typically also the currently used value of Ocs and/or the quality of the DL CCH when triggering the HO back to the macro cell 10 may be stored. This information may later be used if a further HO from the macro cell 10 to the pico cell 10' is attempted under similar conditions to perform a HO check as explained in connection with step 307. A HO request which is likely to fail may then be rejected.

In some implementations, the pico eNB 100' may also first refrain from initiating a HO in response to detecting that the quality of the DL CCH is too low, but rather request the macro eNB 100, which is assumed to be the most significant source of interference on the DL CCH, to protect resources of the DL CCH which are assigned to the UE 50-1. For this purpose, the macro eNB 100 may configure one or more ABSs or RPSs, in which the resources of the DL CCH for the UE 50-1 can then be arranged. The configuration of ABS, for instance in terms of restrictions for measurement reports performed by the UE, is defined in 3GPP TS 36.331. The request for protected resources may be regarded as an implicit indication of the quality of the DL CCH being too low. The request for protected resources could be included in a similar message as the HO request 313. In some scenarios, a LOAD INFORMATION message as described in 3GPP TS 36.423 V11.4.0 could be used for conveying the request for protected resources from the pico eNB 100' to the macro eNB 100.

In the case of a HO back to the macro cell 10, the macro eNB 100 detects that the HO was due to the quality of the DL CCH being too low and may adjust the value of Ocn for the pico cell 10' accordingly. Specifically, as indicated by step 315, the macro eNB 100 may decrease the value of Ocn to the new value as recommended by the pico eNB 100' or may use the indicated used value of Ocs to determine a suitable new value of Ocn using relation (3).

The macro eNB 100 may then proceed by preparing a HO command which indicates the decreased value of Ocn and include this HO command into a HO acknowledgement 316 sent to the pico eNB 100'. The pico eNB 100' then proceeds by sending the HO command 317 to the UE 50-1. The HO may then be completed by the UE 50-1 attaching to the macro cell 10, as indicated by step 318.

Upon setting the new value of Ocn, the timer which was used to trigger the increase of Ocn at step 301 may be reset. In this way, it can be ensured that the UE 50-1 is kept for a certain time in the macro cell 10 before newly attempting to offload the UE 50-1 to the pico cell 10' by increasing the value of Ocn. In some implementations, also a number of previous HO sequences of the UE 50-1 from the macro cell 10 to the pico cell 10' and back to the macro cell 10 may be considered in the decision when to perform a further attempt of offloading the UE 50-1 to the pico cell 10' by increasing the value of Ocn. For example, this number could be used to control the duration of the timer or to prevent a new offloading attempt when the timer expires again. In this way too frequent HO procedures between the macro cell 10 and the pico cell 10' can be avoided.

As explained above, the procedure of setting suitable values for Ocn and Ocs may be applied for a certain UE, e.g., the UE 50-1, to thereby obtain settings which are tailored to this specific UE and its characteristics. However, in some implementations the setting of values of Ocn and Ocs may also be applied to a group of UEs, e.g., all UEs initially served by the macro cell 10 or a subgroup of these UEs, e.g., UEs 50-1, 50-2, and 50-3 as illustrated in FIG. 2. In some implementation, the procedures as illustrated in FIG. 3 may be performed for only one UE of the group, and the obtained adjusted values of Ocn and Ocs then be applied also to the other UEs of the group. In other implementations, the procedures of FIG. 3 may be performed for multiple UEs of the group, using the same settings of Ocn and Ocs. The recommended new value of Ocn according may then be determined as the minimum of the individual values according to relation (3). When applying the same procedures to multiple UEs, messages exchanged between the macro eNB 100 and the pico eNB 100' may be based on UE group identifiers rather than UE individual identifiers, thereby achieving efficient signalling of information between the macro eNB 100 and the pico eNB 100'.

By setting the CIO values group-wise, the CIO setting may be efficiently enhanced for a whole group of UEs without requiring that all UEs of the group go through failed attempts of offloading to the pico cell 10'.

Figure 4:
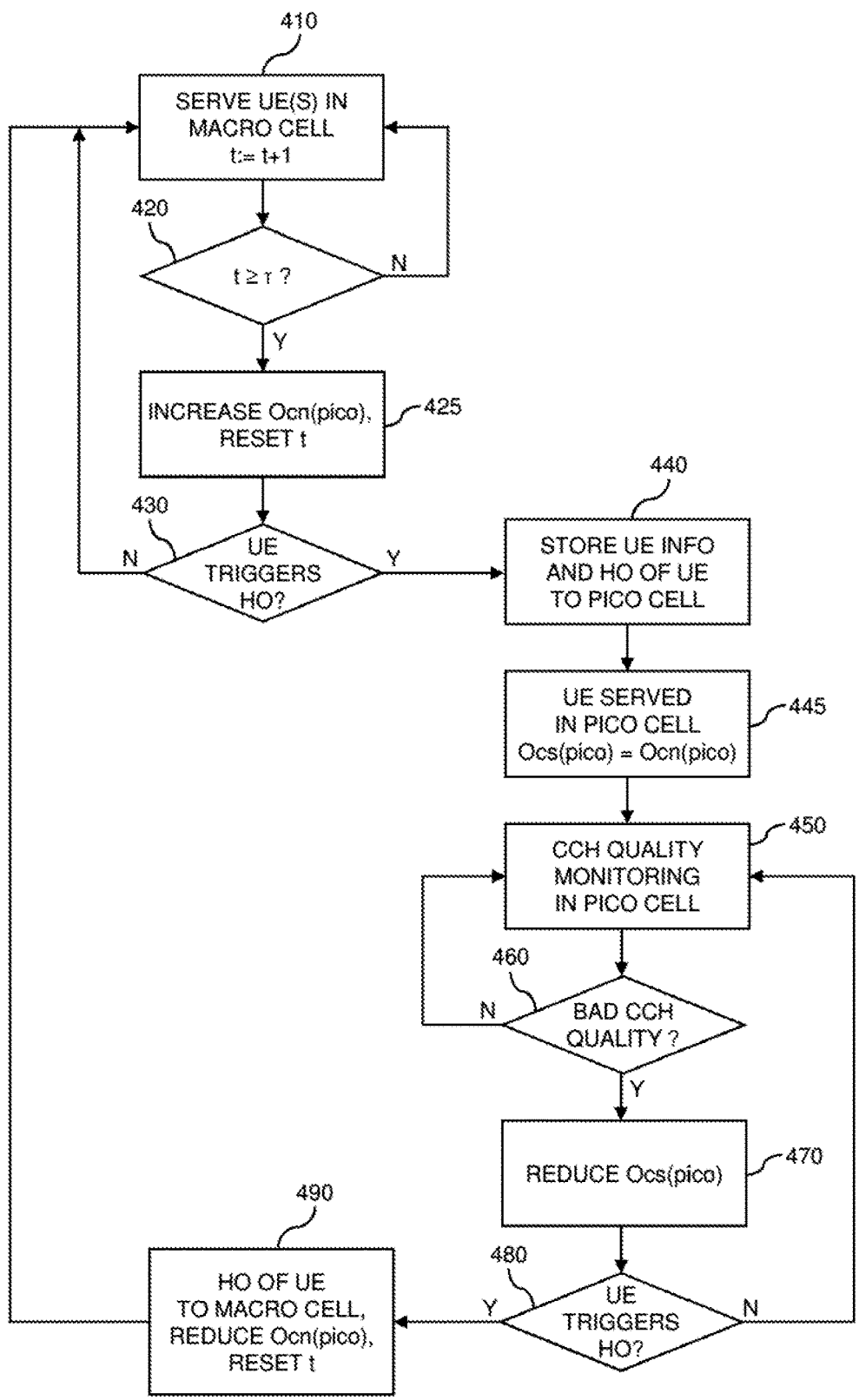
FIG. 4 shows a flowchart for illustrating a method for implementing cell association according to an embodiment of the invention.

FIG. 4 shows a flowchart for illustrating a method as performed by the macro eNB 100 and the pico eNB 100' to implement the above described concepts. Specifically, FIG. 4 further illustrates the logic of such method.

At step 410 one or more UEs are served in the macro cell 10, and the timer t is incremented.

At step 420, a check is performed whether the timer has reached a configured value τ for triggering an attempt of offloading one or more UEs to the pico cell 10'. If this is the case, the method continues with step 425, as indicated by branch "Y". If this is not the case, the method returns to step 410, as indicated by branch "N".

At step 425, the value of Ocn for the pico cell 10' is increased by a certain amount. The increased value of Ocn is indicated to the UE(s). At the same time, the timer t may be reset.

At step 430, a further check is performed whether a HO was triggered with the increased value of Ocn. If this is the case, the method continues with step 440, as indicated by branch "Y". If this is not the case, the method returns to step 410, as indicated by branch "N".

At step 440, information concerning the UE(s) is stored by the macro eNB 100, and the HO of the UE(s) to the pico cell 10' is performed. The value of Ocn for the pico cell as applied in the macro cell 10 when triggering the HO is indicated to the pico cell 10'. As a result of the HO, serving of the UE(s) then continues in the pico cell 10', as illustrated by step 445. The value of Ocs as applied by the pico cell 10' is set to correspond to the value of Ocn as indicated during the HO.

At step 450, the quality of the DL CCH as experienced by the UE(s) in the pico cell is monitored.

At step 460 a check is performed whether the quality of the DL CCH is bad, e.g., below a threshold. If this is the case, the method continues with step 470, as indicated by branch "Y". If this is not the case, the method returns to step 450, as indicated by branch "N".

At step 470, the value of Ocs as applied in the pico cell 10' for the UE(s) is reduced by a certain amount. The reduced value of Ocs is indicated to the UE(s).

At step 480 a check is performed whether a HO was triggered with the reduced value of Ocs. If this is the case, the method continues with step 490, as indicated by branch "Y". If this is not the case, the method returns to step 450, as indicated by branch "N".

At step 490, a HO of the UE(s) back to the macro cell 10 is performed. In this HO, the macro cell 10 is informed that the reason for the HO is bad quality of the DL CCH, so that the macro eNB 100 can take appropriate actions, e.g., by reducing Ocn. During this HO, also a recommended new value of Ocn for the pico cell 10' may be indicated to the macro cell 10, e.g., as determined according to relation (3). Further, also the timer t may be reset at step 490. In some implementations, also the duration of the timer t may be adjusted to prevent too frequent HOs between the macro cell and the pico cell 10', e.g., depending on a number of previous HO sequences from the macro cell 10 to the pico cell 10' and back to the macro cell.

In the following, options for determining the quality of the DL CCH in the pico cell 10' will be explained in more detail.

According to one option, the quality of the DL CCH may be determined from feedback messages from the UE 50-1. By such feedback messages, the UE 50-1 may positively (as ACK) or negatively acknowledge (as NACK) receipt of a radio transmission on the data channel. The feedback messages may be transmitted in accordance with a Hybrid Automatic Repeat Request (HARQ) protocol, such as specified for the LTE radio access technology. Exemplary processes involving such feedback messages are illustrated in FIG. 5.

Figure 5:
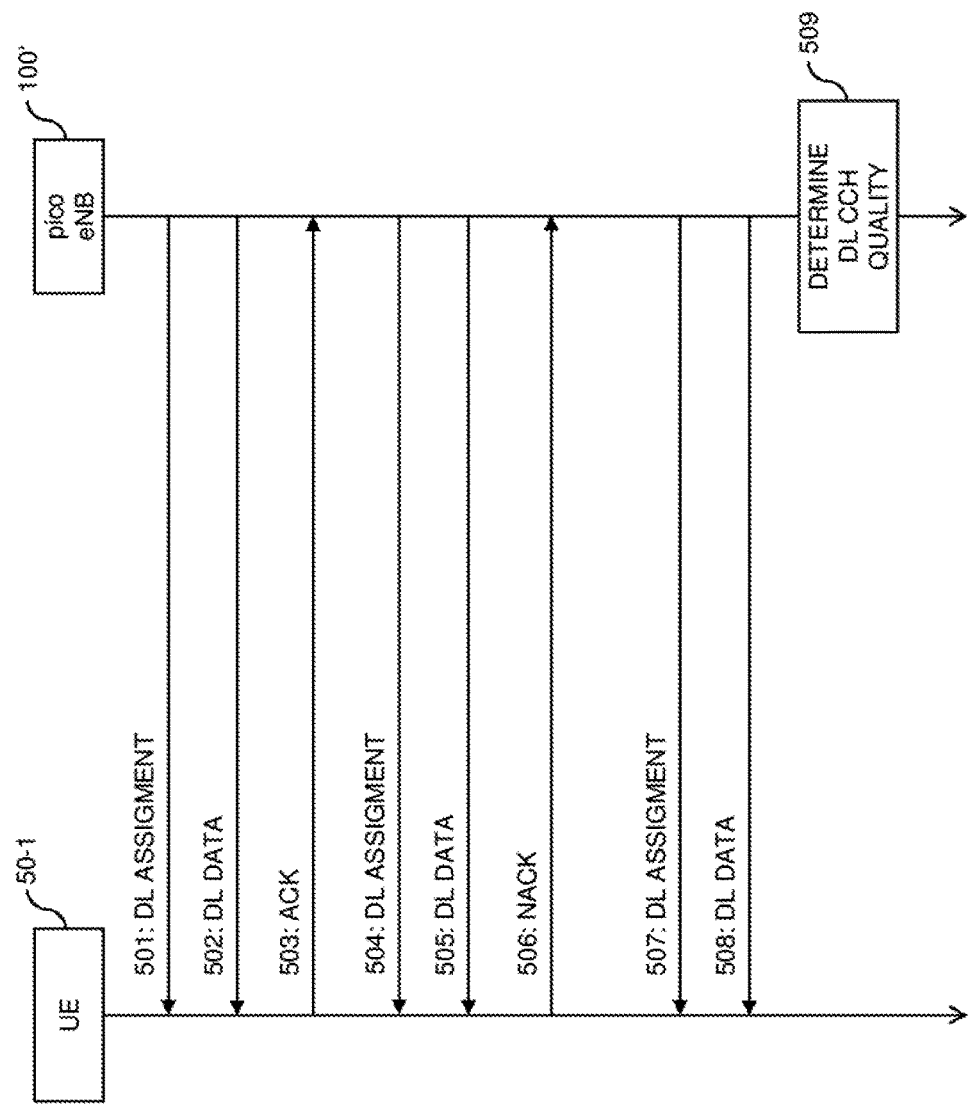
FIG. 5 shows a signalling diagram for illustrating processes according to embodiments of the invention, which may be applied for determining a channel quality of a DL control channel from certain reports sent by the UE.

As illustrated in FIG. 5, the pico eNB 100' may send a DL assignment 501 on the DL CCH to the UE 50-1. The DL assignment 501 indicates allocated resources for a radio transmission 502 on the DL data channel. The pico eNB 100' then proceeds with sending the radio transmission 502 on the DL data channel. Upon receiving and successfully decoding the radio transmission 502, the UE 50-1 sends an ACK 503 to the pico eNB 100'. For this purpose, the UL CCH may be used.

As further illustrated in FIG. 5, the pico eNB 100' may also send a DL assignment 504 which indicates allocated resources for a further radio transmission 505 on the DL data channel, and proceed with sending the radio transmission 505 on the DL data channel. However, in this case the UE 50-1 may not be able to successfully decode the radio transmission 505 and send a NACK 506 to the pico eNB 100'.

As further illustrated in FIG. 5, the pico eNB 100' may also send a DL assignment 507 which indicates allocated resources for a radio transmission 508 on the DL data channel, and proceed with sending the radio transmission 508 on the DL data channel. However, in this case it is assumed that the UE 50-1 does not receive the DL assignment 507 and therefore does not monitor the DL data channel for the radio transmission 508. Accordingly, the UE 50-1 will not send a NACK or ACK for the radio transmission 508.

As indicated by step 509, the pico eNB 100' may then determine the quality of the DL CCH by evaluating the different types of feedback messages 503, 506.

For this purpose the pico eNB 100' may for example monitor the rate of ACKs received from the UE 50-1. From the number or rate of ACKs, the quality of the DL CCH may be deduced by considering the relation of an error rate of radio transmissions on the DL data channel and an error rate of radio transmissions on the DL control channel. Because in LTE systems the radio transmissions on the DL data channel are organized in transport blocks, such error rates may be expressed as Block Error Rate (BLER).

For estimating the BLER of the DL CCH, the following relation may be used:

$$1-BLER_{data,eff}=(1-BLER_{data})\times(1-BLER_{control}), \quad (4)$$

where $BLER_{data,eff}$ denotes the effective BLER as observed by the pico eNB 100' through counted ACKs, assuming that the rate of ACKs is equal to $(1-BLER_{data,eff})$, $BLER_{data}$ denotes the BLER of the DL data channel, and $BLER_{control}$ denotes the BLER of the DL CCH.

This relation reflects that an overall success of a scheduled radio transmission, as acknowledged by an ACK, is achieved only if the DL assignment was successfully transmitted on the DL CCH and the radio transmission on the DL data channel was successfully transmitted on the DL data channel.

In some scenarios, $BLER_{data}$ may be estimated from information typically available at the pico eNB 100', e.g., from information as available from a link adaptation mechanism. For example, the link adaptation mechanism may operate to select a modulation and coding scheme (MCS) for the DL data channel in such a way that a predefined BLER target, in the following referred to as $BLER_{data,tar}$, is reached. Assuming almost ideal link adaptation, $BLER_{data,tar}$ may be used as an estimate for $BLER_{data}$ in the above relation, which means that $BLER_{control}$ can be estimated as:

$$BLER_{control}=1-(1-BLER_{data,eff})/(1-BLER_{data,tar}).$$

If the mobile network provides protected resources, e.g., in the form of ABSs or RPSs, accuracy of the above estimate can be improved by performing the evaluation only for a subset of radio transmissions which are scheduled in unprotected resources.

The pico eNB 100' may also estimate $BLER_{control}$ more directly by monitoring the rate of sent radio transmissions on the DL data channel, for which neither an ACK nor a NACK is received as expected, as illustrated for radio transmission 508 of FIG. 5. In such cases, if the UE 50-1 fails to decode a DL assignment transmitted on the DL CCH, it also will not monitor the DL data channel for the scheduled radio transmission. In fact, the UE 50-1 will not even be aware that a radio transmission on the DL data channel is scheduled for the UE 50-1. Consequently, the UE 50-1 will not send any feedback concerning this radio transmission. Accordingly, monitoring the rate of such scheduled radio transmissions for which neither an ACK nor a NACK is received may be used as a direct estimate of $BLER_{control}$.

When using LTE radio access technology as in the illustrated scenario, the pico eNB 100' will typically expect that the HARQ feedback for a radio transmission on the PDSCH is transmitted in certain resources of the PUCCH, which are defined by the resources of the PDCCH used for sending the DL assignment. The pico eNB 100' may monitor the received energy in these resources and, if the received energy is below a threshold, the pico eNB 100' may deduce that the HARQ feedback was not sent by the UE 50-1. By suitably adjusting the threshold, the risk of false detection of such events can be reduced to a tolerable value. For example, such false detection might occur because there is strong signal attenuation and the sent HARQ feedback produces only low received energy at the pico eNB 100'. Further, such false detection might occur because the received energy is above the threshold due to interference or noise.

A further option of determining $BLER_{control}$ is to use other control messages sent on the DL CCH and to monitor the reaction of the UE 50-1 to such control messages. In particular, the pico eNB 100' may receive reports from the UE 50-1 which indicate a parameter affected by the control messages. From changes in the parameter, the pico eNB 100' may then deduce whether a particular control message was successfully received by the UE 50-1.

In the illustrated scenario using LTE radio access technology, such control messages could be of a type referred to as Transmit Power Control (TPC) command. A TPC command instructs the UE 50-1 to change its transmit power by a certain amount. The UE 50-1 in turn reports an indication of its actually used transmit power. The transmit power may for example be indicated in terms of a Power Headroom Report (PHR), such as specified in 3GPP TS 36.321 V11.2.0. An example of such procedures is illustrated in FIG. 6.

Figure 6:
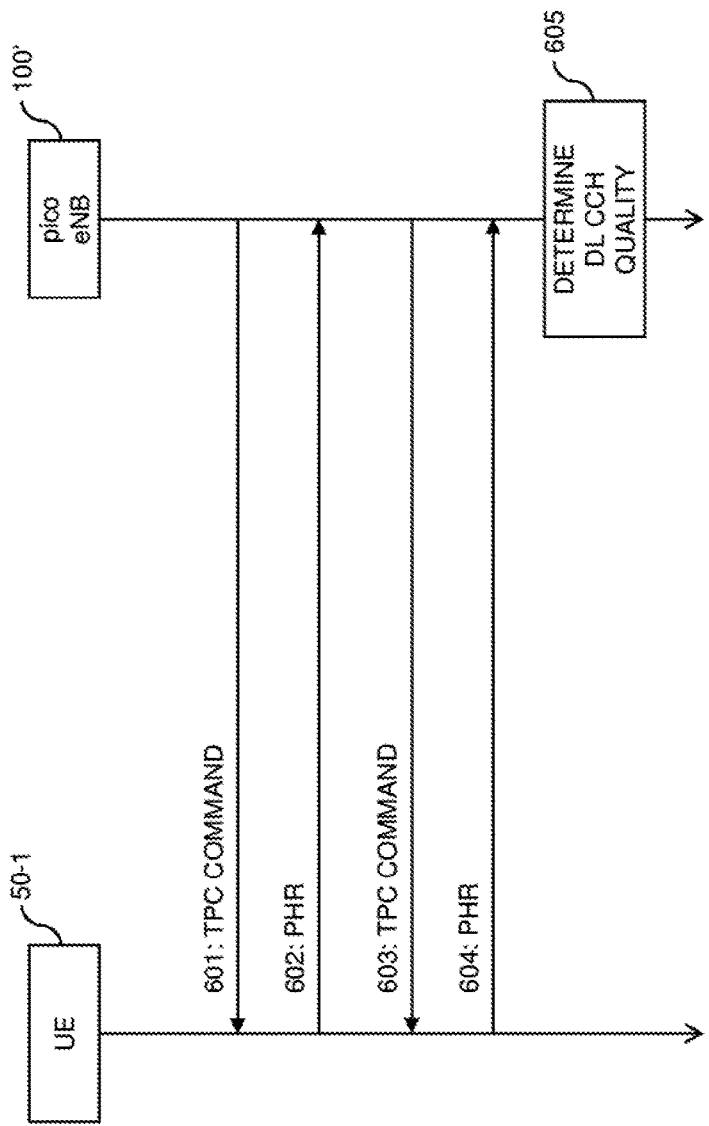
FIG. 6 shows a signalling diagram for illustrating further processes according to embodiments of the invention, which may be applied for determining a channel quality of a DL control channel from certain reports sent by the UE.

In the procedures of FIG. 6, the pico eNB 100' sends a TPC command 601 to the UE 50-1 and subsequently receives a report 602 of the transmit power currently applied by the UE 50-1. The pico eNB 100' then sends a further TPC command 603 to the UE 50-1 and subsequently receives a report 604 of the transmit power currently applied by the UE 50-1. As indicated by step 605, the pico base station 100 may then determine the quality of the DL CCH by evaluating the reports from the UE 50-1.

In particular, if the reported transmit power remains unchanged after the pico eNB 100' has sent a TPC command, the pico eNB 100' can deduce that the transmission of the TPC command on the DL CCH failed due to low quality of the DL CCH. By monitoring the rate of such failed transmissions of the TPC command, the pico eNB 100' may then estimate $BLER_{control}$.

The pico eNB 100' may perform such evaluations on the basis of reports from the UE 50-1 repeatedly and average the results of such repeated evaluations to obtain a more precise estimate.

Because TPC commands, and also other similar commands, may be sent at a much lower rate than radio transmissions on the DL data channel, it may be in some cases advantageous to combine this option with the above option of monitoring feedback messages, e.g., by averaging. The latter option may also help to address situations when the UE 50-1 is operating at its transmit power limit, so that TPC commands will not have the expected effect.

The above options have the advantage that the pico eNB 100' may evaluate characteristics which can be observed by the pico eNB 100' itself which means that these options can be efficiently implemented without impact on the UE 50-1 or other network nodes.

In further options, the pico eNB 100' may also receive specific information for determining the channel quality of the DL CCH. For example, such information could be received from the UE 50-1 or from another network node, e.g., from the macro eNB 100.

For example, the pico eNB 100' may request a measurement report for the channel quality of the DL CCH from the UE 50-1. The UE 50-1 may perform corresponding measurements on the DL CCH and provide a report of such measurements to the pico eNB 100', which may then determine the quality of the DL CCH from the reported measurements. An example of such procedures is illustrated in FIG. 7.

Figure 7:
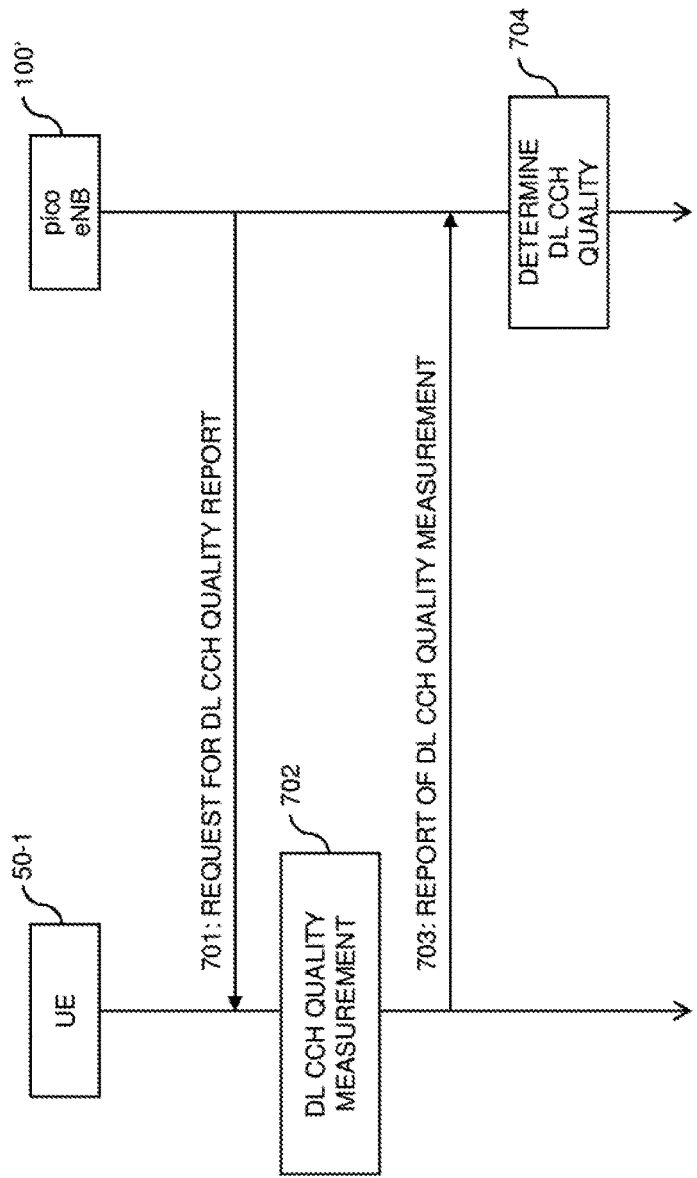
FIG. 7 shows a signalling diagram for illustrating further processes according to embodiments of the invention, which may be applied for determining a channel quality of a DL control channel from measurement reports sent by a UE.

In the procedures of FIG. 7, the pico eNB 100' sends a request 701 to the UE 50-1 to initiate reporting of the DL CCH quality. Upon receiving the request 701, the UE 50-1 may perform measurements on the DL CCH and/or aggregate results from previously performed measurements on the DL CCH, as indicated by step 702. The UE 50-1 may then send a report 703 of the measurements to the pico eNB 100'. From the report 703, the pico eNB 100' may determine the quality of the DL CCH. In some cases, the quality of the DL CCH may be already determined by the UE 50-1 and indicated in the report 703. In further cases, the pico eNB 100' may further process measurement results in the report 703 to determine the quality of the DL CCH. The request 701 may also indicate that the UE 50-1 should perform the measurements in unprotected resources, e.g., not in ABSs or RPSs, to accurately reflect the impact of interference from other cells.

According to a further example, the pico eNB 100' may request information on the utilization of the DL CCH of a further cell from another network node. For example, the pico eNB 100' may request such utilization information from the macro eNB 100 which serves the macro cell 10. The other network node may determine the utilization information and provide the utilization information to the pico eNB 100', which may then determine the quality of the DL CCH from the reported utilization information. The DL CCH utilization information may for example be provided in terms of a load on the DL CCH, e.g., indicting a relative portion of utilized resources of the DL CCH.

The pico eNB 100' may perform such evaluations on the basis of measurement reports from the UE 50-1 repeatedly and average the results of such repeated evaluations to obtain a more precise estimate.

Figure 8:
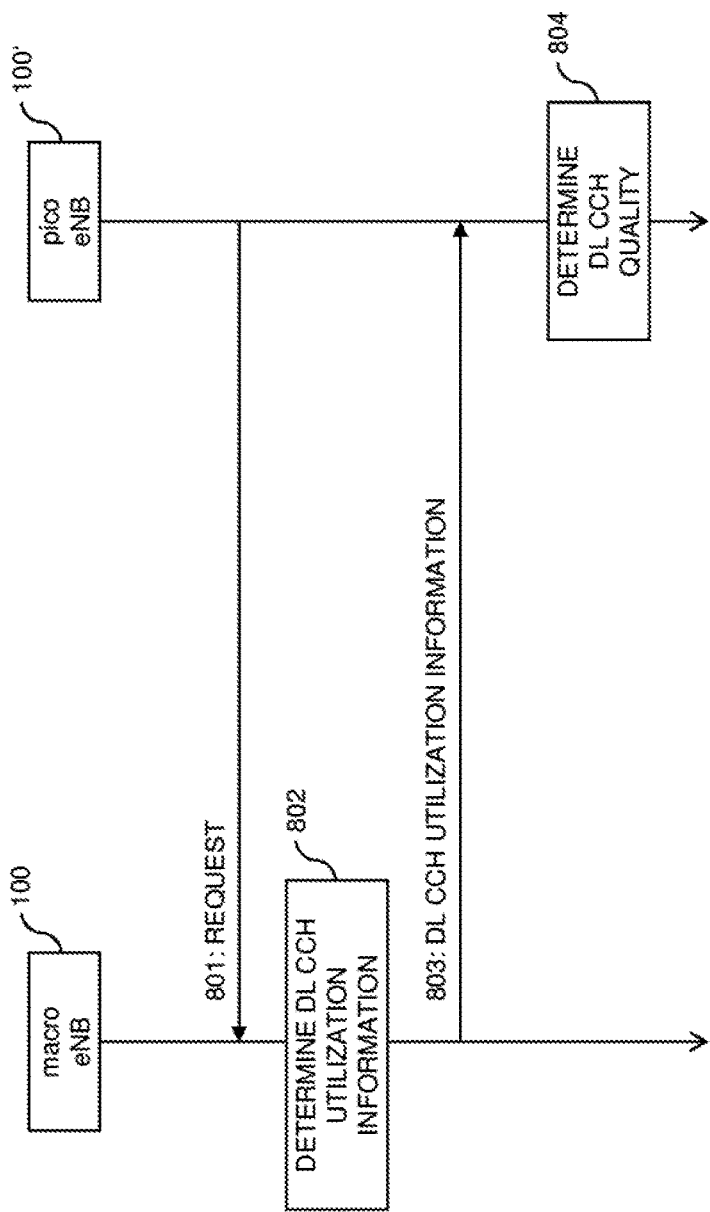
FIG. 8 shows a signalling diagram for illustrating further processes according to embodiments of the invention, which may be applied for determining a channel quality of a DL control channel from information on the utilization of a DL control channel of another cell.

An example of such procedures for reporting DL CCH utilization information is illustrated in FIG. 8. In the procedures of FIG. 8, the pico eNB 100' sends a request 801 to the macro eNB 100 to initiate reporting of the utilization information. Upon receiving the request 801, the macro eNB 100 may determine the utilization information, as indicated by step 802, and indicate it to the pico eNB 100', as indicated by step 803. From the utilization information 803, the pico base station 100' may determine the quality of the DL CCH. The messages 801 and 803 of FIG. 8 may for example be transmitted via the X2 interface defined between LTE base stations.

Using procedures as explained in connection with FIG. 8, the pico eNB 100' may request the DL CCH utilization information from the eNB(s) that create(s) most interference to a certain UE 50-1, 50-2, 50-3 in the pico cell 10'. Based on this knowledge the pico eNB 100' can estimate the probability that the DL CCH of the interfering eNB will not collide with its own DL CCH, which may be used as an estimate of the quality of the DL CCH.

The DL CCH utilization information may also be reported in terms of a parameter that relates the load on the DL CCH of the further cell to the load of the DL data channel of the further cell. In some cases, the pico eNB 100' may already have access to the load on the DL data channel of the further cell. For example, this load may be reflected in channel quality reports provided to the pico eNB 100', e.g., channel quality reports based on shifted CRS or dedicated reference symbols for interference measurement such as defined in 3GPP TS 36.213 V11.3.0 or 3GPP TS 36.331. In connection with the reported parameter, the pico eNB 100' may then estimate the actual utilization of the DL CCH of the further cell and estimate the channel quality of the DL CCH for a certain UE in its cell. This way of reporting the DL CCH utilization information may help to reduce the associated load on the pico eNB's interface(s) to other network nodes, such as on the X2 interface.

Figure 9:
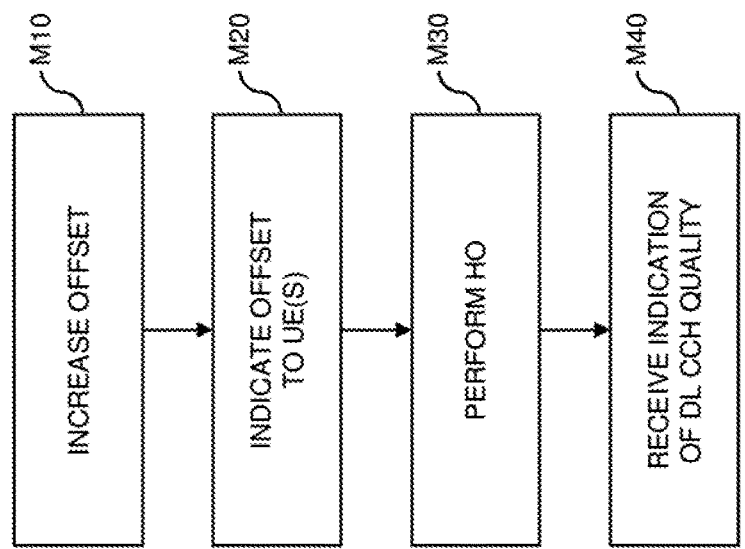
FIG. 9 shows a flowchart for illustrating a method according to an embodiment of the invention.

FIG. 9 shows a flowchart for illustrating a method of controlling radio transmission in a mobile network. The method may be used for implementing the above-described concepts in a network node of the mobile network. In particular, this network node is responsible for serving a cell of the mobile network. The network node may for example correspond to the macro eNB 100.

At step M10, the network node, which serves a cell of the mobile network, increases an offset value to be added to a channel quality value measured by a UE or a group of UEs for triggering a HO of the UE(s) from the cell to a further cell of the mobile network. The offset value may specifically apply to the triggering of a HO from the cell to a certain further cell, such as the above-mentioned Ocn for the pico cell 10'. The increase of the offset value may be limited by a configurable maximum offset value.

At step M20, the network node indicates the offset value to the UE(s). Steps M10 and M20 may be repeated until a HO of the UE(s) to the further cell is triggered.

At step M30, the network node performs the HO of the UE(s) to the further cell. The network node may also indicate the offset value as applied when the HO was triggered to a further network node which serves the further cell.

At step M40, after the handover to the further cell, the network node receives an indication of a channel quality of a DL CCH of the further cell as experienced by the UE(s). This indication may be received when performing a further HO of the UE(s) from the further cell back to the cell. In some implementations, this indication may be received through a request to protect resources of the DL CCH, e.g., by configuring one or more ABSs or one or more RPSs. In response to the received indication of the channel quality of the DL CCH, the network node may adjust the offset value for this UE. The indication of the channel quality of the DL CCH may then also include a recommendation for the adjusted offset value.

In some implementations, the network node may also protect resources of the DL CCH, e.g., by configuring one or more ABSs or one or more RPSs. In some scenarios, if the network node performs a further HO of the UE(s) from the further cell back to the cell, serving of the UE(s) is again performed in the cell of the network node, and the network node may indicate the adjusted offset value to the UEs. If such further HO is performed, the network node may receive the indication of the channel quality of the DL CCH in control signalling related to the further HO.

In some implementations, the network node may also monitor a number of HO sequences of the UE(s) from the cell to the further cell and back to the cell. Depending on the monitored number of HO sequences, the network node may then prevent a further HO of the UE(s). For this purpose, the network node may store an identity of the UE(s). Further, the network node may store the offset value as indicated to the UEs before the HO to the further cell is triggered.

As can be understood from the above explanations, the cell may be served by a macro base station and the further cell may be served by a pico base station which has a lower transmit power than the macro base station.

Figure 10:
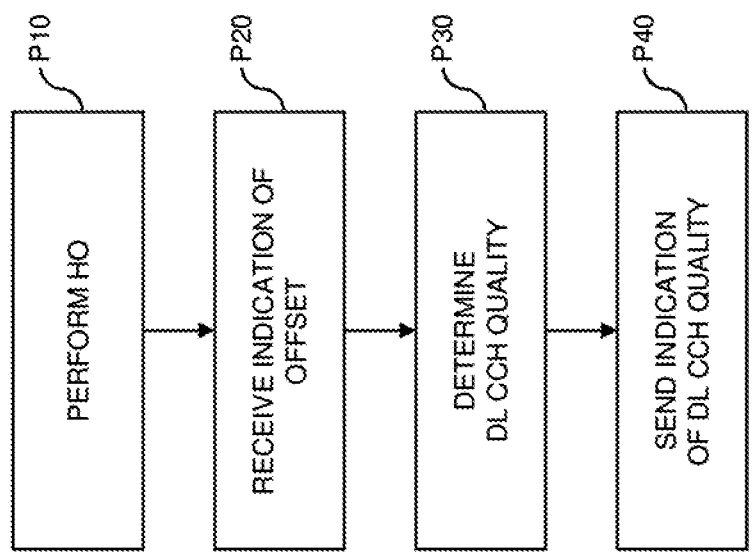
FIG. 10 shows a flowchart for illustrating a further method according to an embodiment of the invention.

FIG. 10 shows a flowchart for illustrating a method of controlling radio transmission in a mobile network. The method may be used for implementing the above-described concepts in a network node of the mobile network. In particular, this network node is responsible for serving a cell of the mobile network. The network node may for example correspond to the pico eNB 100'.

At step P10, the network node, which serves the cell of the mobile network, performs a HO of one or more UEs from a further cell of the mobile network to the cell.

At step P20, the network node receives an indication of an offset value added to a channel quality value measured by the UE(s) for triggering the HO to the cell.

At step P30, the network node determines a channel quality of a DL CCH of the cell as experienced by the UEs. For this purposes, procedures as illustrated in FIGS. 5 to 8 may be applied by the network node.

Specifically, the network node may receive a measurement report from the UE and determine the channel quality of the DL CCH on the basis of the measurement report, e.g., as explained in connection with FIG. 7. The network node may also send a request for the measurement report from the UE and receive the measurement report in response to the request.

Alternatively or in addition, the network node may receive control channel utilization information from a further network node, e.g., from a neighboring macro base station such as the macro eNB 100, and determine the channel quality of the DL CCH on the basis of the received control channel utilization information, e.g., as explained in connection with FIG. 8. The control channel utilization information may indicates utilization of a DL CCH of the further cell, e.g., in terms of a load on the DL CCH or in terms of a parameter relating the load on the DL CCH of the further cell to a load on a data channel of the further cell.

Alternatively or in addition, the network node may also determine the channel quality of the DL CCH by monitoring feedback messages from the UE, e.g., as explained in connection with FIG. 5. For this purpose, the network node may send radio transmissions on the data channel to the UE and receive feedback messages from the UE, which each positively or negatively acknowledge receipt of a radio transmission by the UE. Such feedback messages may be monitored to determine the channel quality of the DL CCH, e.g., in terms of a BLER. For example, a rate of those feedback messages may be monitored by the network node, which positively acknowledge receipt of a radio transmission. Alternatively or in addition, a rate of those radio transmissions may be monitored by the network node, for which none of the feedback messages, i.e., neither positive nor negative acknowledgement, is received by the node.

Alternatively or in addition, the network node may also determine the channel quality of the DL CCH by sending control messages on the DL CCH to the UE and monitoring the UE's reaction, as explained in connection with FIG. 6. For example, the network node may send control messages to the UE and receive reports from the UE which indicate a parameter affected by the control messages. The network node may then determine the channel quality of the DL CCH by evaluating the parameter indicated by the reports, e.g., by comparing successively received parameters to identify whether the parameter changed as expected in reaction to the control message. The control messages may for example be commands for changing the transmit power of the UE, such as the above-mentioned TPC commands. The parameter indicated by the reports may then be currently applied transmit power of the UE.

At step P40, the network node sends an indication of the determined channel quality of the DL CCH to a further network node serving the further cell. The network node may send the indication of the channel quality of the DL CCH in control signalling related to a further HO of the UE(s) back to the further cell. In some implementations, the network node may also send the indication of the channel quality of the downlink control channel by requesting the further network node to protect radio resources of the DL CCH which are assigned to the UE(s).

In some scenarios, the network node may adjust a further offset value to be added to a channel quality value measured by the UEs for triggering a handover from the cell. This may be accomplished depending on the determined channel quality. The network node may then indicate the adjusted further offset value to the UEs. An example of such further offset value is the above-mentioned value Ocs applied by the pico eNB 100'.

In some scenarios, the network node may perform a further HO of the UEs from the cell back to the further cell. The network node may then also indicate the adjusted further offset value to a further network node serving the further cell, such as by way of example done in the procedure of FIG. 3 with the value of Ocs, which is indicated from the pico eNB 100' to the macro eNB 100.

In some scenarios, the network node may store an identity of the UE(s) for which a HO back to the further cell is performed. Further, the network node may store the offset value as indicated to the UEs before the HO to the further cell is triggered. This information may be used to prevent a further HO of the UE(s) to the cell under similar conditions. For the same purpose, the network node may also monitor a number of HO sequences of the UE(s) from the further cell to the cell and back to the further cell.

It is noted that the methods of FIGS. 9 and 10 may be combined with each other in a system comprising a network node implementing the method of FIG. 9 and a further network node implementing the method of FIG. 10.

Figure 11:
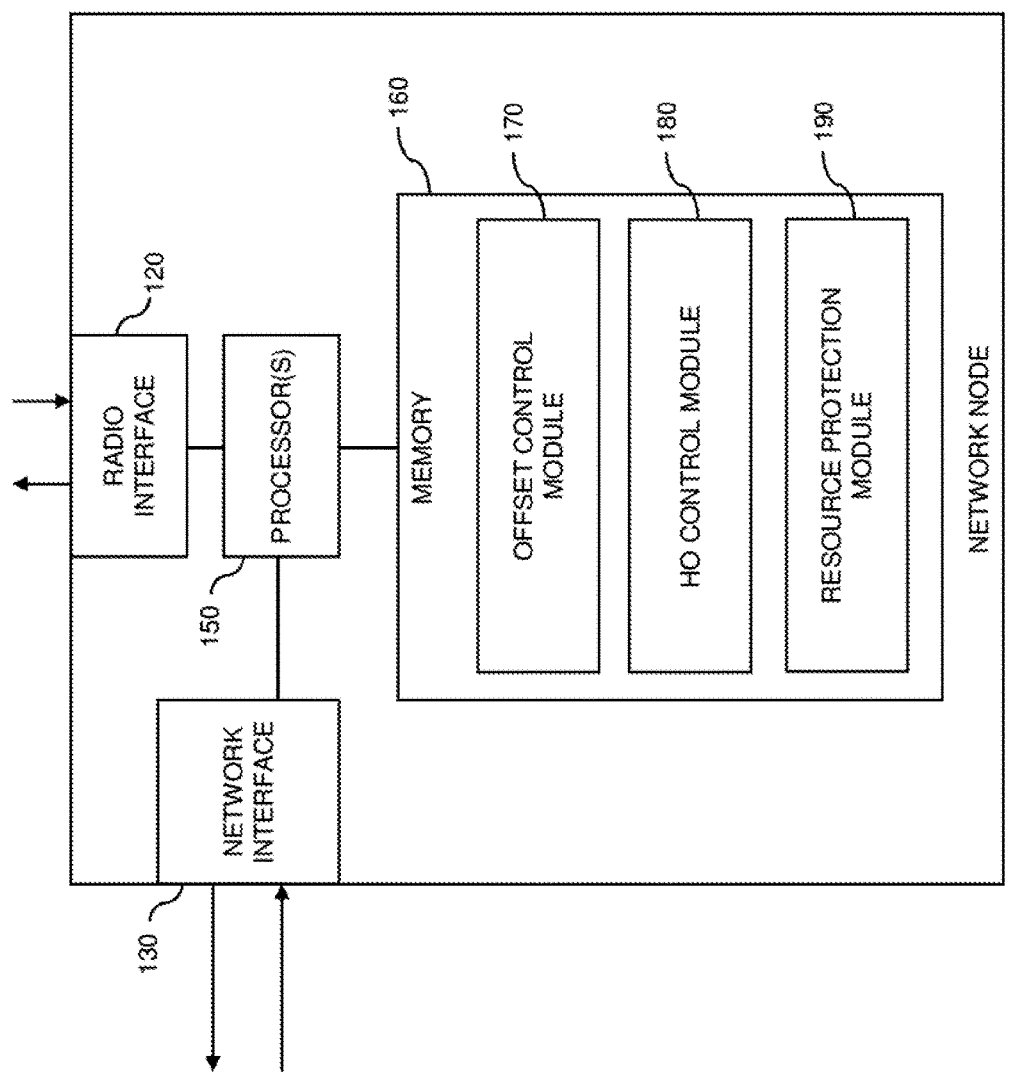
FIG. 11 schematically illustrates implementation of a network node according to an embodiment of the invention.

FIG. 11 illustrates exemplary structures which may be used for implementing the above concepts in a node of a mobile network, such as the macro eNB 100'.

As illustrated, the may include a radio interface 120, e.g., such specified for an eNB in the LTE radio access technology. The radio interface 120 may then be used for establishing a radio link to UEs in a cell served by the network node. Such radio links may be provided using a DL CCH of the cell and a data channel of the cell, e.g., a DL data channel and/or an UL data channel. Further, the radio links may also be provided using an UL CCH of the cell. In some scenarios, the radio interface 120 may also be used for establishing a wired connection to a separate radio unit. Further, the network node may also be provided with a network interface 130 for connecting to other network nodes of the mobile network. For example, if the network node is implemented as an eNB, the network interface 130 may implement the X2 interface as specified for the LTE radio access technology.

Further, the network node includes one or more processors 150 coupled to the interfaces 120, 130, and a memory 160 coupled to the processor(s) 150. The memory 160 may include a read-only memory (ROM), e.g., a flash ROM, a random-access memory (RAM), e.g., a dynamic RAM (DRAM) or static RAM (SRAM), a mass storage, e.g., a hard disk or solid state disk, or the like. The memory 160 includes suitably configured program code to be executed by the processor(s) 150 so as to implement the above-described functionalities of the network node. In particular, the memory 160 may include an offset control module 170 for implementing the above-described functionalities for setting and adjusting offset values used for triggering a HO, such as the above-mentioned CIO values Ocn or Ocs. Further, the memory 160 may also include a HO module 180 for implementing the above-mentioned functionalities of controlling HOs and conveying information during such HO. Still further, the memory 160 may include a resource protection module 190 for implementing protection of resources in another cell, e.g., by configuring one or more ABSs or one or more RPSs.

It is to be understood that the structures as illustrated in FIG. 11 are merely schematic and that the network node may actually include further components which, for the sake of clarity, have not been illustrated, e.g., further interfaces or processors. Also, it is to be understood that the memory 160 may include further types of program code modules, which have not been illustrated, e.g., program code modules for implementing known functionalities of an eNB. According to some embodiments, also a computer program may be provided for implementing functionalities of the network node, e.g., in the form of a physical medium storing the program code and/or other data to be stored in the memory 160 or by making such program code or other data available for download.

Figure 12:
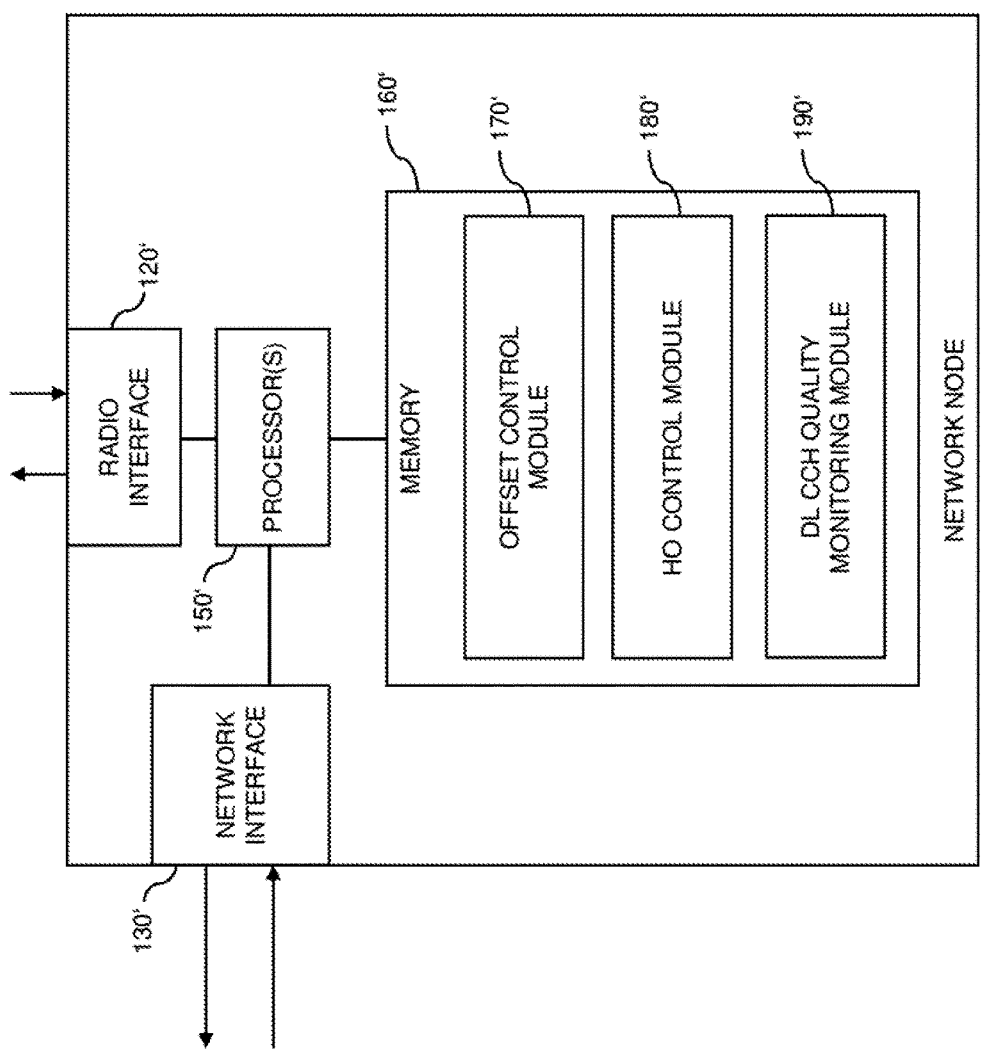
FIG. 12 schematically illustrates implementation of a further network node according to an embodiment of the invention.

FIG. 12 illustrates exemplary structures which may be used for implementing the above concepts in a node of a mobile network, such as the pico eNB 100'.

As illustrated, the network node may include a radio interface 120', e.g., such specified for an eNB in the LTE radio access technology. The radio interface 120' may then be used for establishing a radio link to UEs in a cell served by the network node. Such radio links may be provided using a DL CCH of the cell and a data channel of the cell, e.g., a DL data channel and/or an UL data channel. Further, the radio links may also be provided using an UL CCH of the cell. In some scenarios, the radio interface 120' may also be used for establishing a wired connection to a separate radio unit. Further, the network node may also be provided with a network interface 130' for connecting to other network nodes of the mobile network. For example, if the network node is implemented as an eNB, the network interface 130' may implement the X2 interface as specified for the LTE radio access technology.

Further, the node includes one or more processors 150' coupled to the interfaces 120', 130', and a memory 160' coupled to the processor(s) 150'. The memory 160' may include a ROM, e.g., a flash ROM, a RAM, e.g., a DRAM or SRAM, a mass storage, e.g., a hard disk or solid state disk, or the like. The memory 160' includes suitably configured program code to be executed by the processor(s) 150' so as to implement the above-described functionalities of the network node. In particular, the memory 160' may include an offset control module 170' for implementing the above-described functionalities for setting and adjusting offset values used for triggering a HO, such as the above-mentioned CIO values Ocn or Ocs. Further, the memory 160' may also include a HO module 180' for implementing the above-mentioned functionalities of controlling HOs and conveying information during such HO. Still further, the memory 160' may include a DL CCH quality monitoring module 190' for performing the above-described determination of the quality of the DL CCH.

It is to be understood that the structures as illustrated in FIG. 12 are merely schematic and that the network node may actually include further components which, for the sake of clarity, have not been illustrated, e.g., further interfaces or processors. Also, it is to be understood that the memory 160' may include further types of program code modules, which have not been illustrated, e.g., program code modules for implementing known functionalities of an eNB. According to some embodiments, also a computer program may be provided for implementing functionalities of the network node, e.g., in the form of a physical medium storing the program code and/or other data to be stored in the memory 160' or by making such program code or other data available for download.

As can be seen, the concepts as described above may be used for efficiently controlling radio transmission in a cell of a mobile network. In particular, the CIO value for a pico cell may be adjusted to achieve an optimized setting that on the one hand considers the interference situation and on the other hand the radio and load conditions as experienced by an individual UE or a group of UEs. Typically a setting of the CIO value may be achieved which is close to the maximum possible value. In this way, offloading of traffic to the pico cell may be better utilized. At the same time, a robust user performance in the pico cell may be ensured. Further, the CIO value may be adapted dynamically, for example taking into account the current radio channel and traffic load conditions. As compared to for example RSRQ based measurement reporting and HO triggering, the concepts allow for taking the CCH performance into account more accurately.

It is to be understood that the examples and embodiments as explained above are merely illustrative and susceptible to various modifications. For example, the described CIO adaptation mechanism may be applied in various network deployments, also including homogeneous deployments in which different base stations operate at substantially the same power. Still further, it should be understood that the illustrated concepts may be applied with respect to multiple cells, e.g., in a scenario in which traffic is to be offloaded from a macro cell to multiple pico cells. Also, some of the described functionalities may be distributed in different nodes. For example, when using UMTS radio access technology, functionalities as described for the macro eNB 100 or pico eNB 100' may be distributed between a Radio Network Controller (RNC) and a Node B. Generally, the illustrated nodes may be implemented by a single device or by a system of multiple devices. Moreover, it is to be understood that the above concepts may be implemented by using correspondingly designed software to be executed by one or more processors of an existing device, or by using dedicated device hardware.

What is claimed is:

1. A method of controlling radio transmission in a mobile network, the method implemented by a network node serving a cell of the mobile network, the method comprising:
    forcing a user equipment to handover from the cell to a further cell of the mobile network by iteratively indicating an offset value for the user equipment that is to be added to a channel quality value measured by the user equipment for triggering the handover from the cell to a further cell of the mobile network; and
    after the handover to the further cell, the network node receiving an indication of a channel quality of a downlink control channel of the further cell, as experienced by the user equipment, wherein the network node protects radio resources of the downlink control channel which are assigned to the user equipment in response to the received indication of the channel quality of the downlink control channel which comprises a request to protect the radio resources of the downlink control channel.

2. The method according to claim 1, further comprising, in response to the received indication of the channel quality of the downlink control channel, the network node forcing the user equipment to handover.

3. The method according to claim 2, further comprising the network node applying at least one of the offset values to a group of user equipments which includes said user equipment.

4. The method according to claim 2, further comprising:
    the network node performing a further handover of the user equipment from the further cell back to the cell; and
    after the further handover, the network node indicating at least one of the offset values to the user equipment.

5. The method according to claim 4, further comprising the network node applying at least one of the offset values to a group of user equipments which includes said user equipment.

6. The method according to claim 1, comprising:
    the network node monitoring a number of handover sequences of the user equipment from the cell to the further cell and back to the cell; and
    depending on the monitored number of handover sequences, the network node preventing a further handover of the user equipment to the further cell under similar conditions to avoid same poor quality of the downlink control channel.

7. A method of controlling radio transmission in a mobile network, the method implemented by a network node serving a cell of the mobile network, the method comprising:
    the network node performing a handover of a user equipment from a further cell of the mobile network to the cell;
    the network node receiving an indication of an offset value, set by a further network node serving the further cell and added by the user equipment to a channel quality value measured by the user equipment, for triggering the handover to the cell;
    the network node determining a channel quality of a downlink control channel of the cell as experienced by the user equipment; and
    sending an indication of the determined channel quality of the downlink control channel from the network node to a further network node serving the further cell, wherein the further network node protects radio resources of the downlink control channel which are assigned to the user equipment in response to the received indication of the channel quality of the downlink control channel which comprises a request to protect the radio resources of the downlink control channel.

8. The method according to claim 7, further comprising:
    depending on the determined channel quality, the network node adjusting a further offset value to be added to a channel quality value measured by the user equipment for triggering a handover from the cell; and
    the network node indicating the adjusted further offset value to the user equipment.

9. The method according to claim 8, further comprising:
    the network node monitoring a number of handover sequences of the user equipment from the further cell to the cell and back to the further cell; and
    depending on the monitored number of handover sequences, the network node preventing a further handover of the user equipment from the further cell to the cell under similar conditions to avoid same poor quality of the downlink control channel.

10. The method according to claim 7, further comprising:
    the network node monitoring a number of handover sequences of the user equipment from the further cell to the cell and back to the further cell; and
    depending on the monitored number of handover sequences, the network node preventing a further handover of the user equipment from the further cell to the cell under similar conditions to avoid same poor quality of the downlink control channel.

11. A network node for a mobile network, the network node comprising:
    at least one interface and at least one processor, wherein the at least one processor is configured to:
        force a user equipment to handover from the cell to a further cell of the mobile network by iteratively indicating an offset value for the user equipment that is to be added to a channel quality value measured by the user equipment for triggering the handover from the cell to a further cell of the mobile network; and
        after the handover to the further cell, receive an indication of a channel quality of a downlink control channel of the further cell, as experienced by the user equipment, wherein the network node protects radio resources of the downlink control channel which are assigned to the user equipment in response to the received indication of the channel quality of the downlink control channel which comprises a request to protect the radio resources of the downlink control channel.

12. The network node according to claim 11, wherein the at least one processor is configured, in response to the received indication of the channel quality of the downlink control channel, to force the user equipment to handover.

13. The network node according to claim 12, wherein the at least one processor is further configured to apply at least one of the offset values to a group of user equipments which includes said user equipment.

14. The network node according to claim 12, wherein the at least one processor is configured to:

perform a further handover of the user equipment from the further cell back to the cell; and after the further handover, indicate at least one of the offset values to the user equipment.

15. The network node according to claim 14, wherein the at least one processor is configured to apply at least one of the offset values to a group of user equipments which includes said user equipment.

16. The network node according to claim 11, wherein the at least one processor is configured to:

monitor a number of handover sequences of the user equipment from the cell to the further cell and back to the cell; and depending on the monitored number of handover sequences, prevent a further handover of the user equipment to the further cell under similar conditions to avoid same poor quality of the downlink control channel.

17. A network node for a mobile network, the network node comprising:

at least one interface and at least one processor, wherein the at least one processor is configured to:

perform a handover of a user equipment from a further cell of the mobile network to a cell served by the network node, receive an indication of an offset value, set by a further network node serving the further cell and added by the user equipment to a channel quality value measured by the user equipment, for triggering the handover to the cell;

determine a channel quality of a downlink control channel of the cell as experienced by the user equipment; and send an indication of the determined channel quality of the downlink control channel a further network node serving the further cell, wherein the further network node protects radio resources of the downlink control channel which are assigned to the user equipment in response to the received indication of the channel quality of the downlink control channel which comprises a request to protect the radio resources of the downlink control channel.

18. The network node according to claim 17, wherein the at least one processor is configured to:

depending on the determined channel quality, adjust a further offset value to be added to a channel quality value measured by the user equipment for triggering a handover from the cell; and indicate the adjusted further offset value to the user equipment.

19. The network node according to claim 18, wherein the at least one processor is configured to:

monitor a number of handover sequences of the user equipment from the further cell to the cell and back to the further cell; and depending on the monitored number of handover sequences, prevent a further handover of the user equipment from the further cell to the cell under similar conditions to avoid same poor quality of the downlink control channel.

20. The network node according to claim 17, wherein the at least one processor is configured to:

monitor a number of handover sequences of the user equipment from the further cell to the cell and back to the further cell; and depending on the monitored number of handover sequences, prevent a further handover of the user equipment from the further cell to the cell under similar conditions to avoid same poor quality of the downlink control channel.

21. A computer program product stored on a non-transitory computer readable medium and comprising program code that, when executed by at least one processor of a network node for a mobile network, causes the network node to:

force a user equipment to handover from the cell to a further cell of the mobile network by iteratively indicating an offset value for the user equipment that is to be added to a channel quality value measured by the user equipment for triggering the handover from the cell to a further cell of the mobile network; and after the handover to the further cell, receive an indication of a channel quality of a downlink control channel of the further cell as experienced by the user equipment, wherein the network node protecting radio resources of the downlink control channel which are assigned to the user equipment in response to the received indication of the channel quality of the downlink control channel which comprises a request to protect the radio resources of the downlink control channel.

22. A computer program product stored on a non-transitory computer readable medium and comprising program code that, when executed by at least one processor of a network node for a mobile network, causes the network node to:

perform a handover of a user equipment from a further cell of the mobile network to a cell served by the network node, receive an indication of an offset value, set by a further network node serving the further cell and added by the user equipment to a channel quality value measured by the user equipment, for triggering the handover to the cell;

determine a channel quality of a downlink control channel of the cell as experienced by the user equipment; and send an indication of the determined channel quality of the downlink control channel a further network node serving the further cell, wherein the further network node protects radio resources of the downlink control channel which are assigned to the user equipment in response to the received indication of the channel quality of the downlink control channel which comprises a request to protect the radio resources of the downlink control channel.

* * * * *